United States Patent [19]

Inoue et al.

[11] Patent Number: 4,763,973
[45] Date of Patent: Aug. 16, 1988

[54] WAVEGUIDE-TYPE OPTICAL SENSOR

[75] Inventors: Nobuhisa Inoue, Kyoto; Masaharu Matano, Kyoto; Tsukasa Yamashita, Nara, all of Japan

[73] Assignee: Omron Tateisi Electronics Co., Kyoto, Japan

[21] Appl. No.: 832,732

[22] Filed: Feb. 25, 1986

[30] Foreign Application Priority Data

Feb. 27, 1985 [JP] Japan .................................. 60-40133
Feb. 27, 1985 [JP] Japan .................................. 60-40136

[51] Int. Cl.$^4$ ............................ G02B 6/10; H01J 5/16; H01S 3/17
[52] U.S. Cl. ............................... 350/96.13; 350/96.14; 250/227; 372/40
[58] Field of Search ............... 350/96.11, 96.12, 96.13, 350/96.14; 250/227, 231 R; 372/40, 41

[56] References Cited

U.S. PATENT DOCUMENTS

| | | | |
|---|---|---|---|
| 3,874,782 | 4/1975 | Schmidt | 350/96.13 |
| 4,334,781 | 6/1982 | Ozeki | 350/385 |
| 4,359,260 | 11/1982 | Reinhart et al. | 350/385 |
| 4,415,226 | 11/1983 | Verber et al. | 350/96.13 |
| 4,502,037 | 2/1985 | LeParquier et al. | 350/96.14 |
| 4,569,570 | 2/1986 | Brogardh et al. | 372/40 |
| 4,575,179 | 3/1986 | Lee et al. | 350/96.13 |
| 4,595,253 | 6/1986 | Yamashita et al. | 350/96.14 |
| 4,618,210 | 10/1986 | Kondo | 350/96.13 |
| 4,650,992 | 3/1987 | Ruhrmann | 350/231 R |

Primary Examiner—William L. Sikes
Assistant Examiner—Akm E. Ullah
Attorney, Agent, or Firm—Stevens, Davis, Miller & Mosher

[57] ABSTRACT

A plurality of modulating elements are provided on a substrate to modulate the intensity of input light in dependence upon an applied physical quantity. Intensity-modulated output optical signals from these plural modulating elements propagate in parallel along the substrate. These parallel optical signals are successively diffracted by a pulsed surface acoustic wave, and the diffracted light is then focused. Since parallel optical signals from a plurality of modulating elements can thus be converted into a serial optical signal, the signal can be transmitted by a single optical fiber.

6 Claims, 10 Drawing Sheets

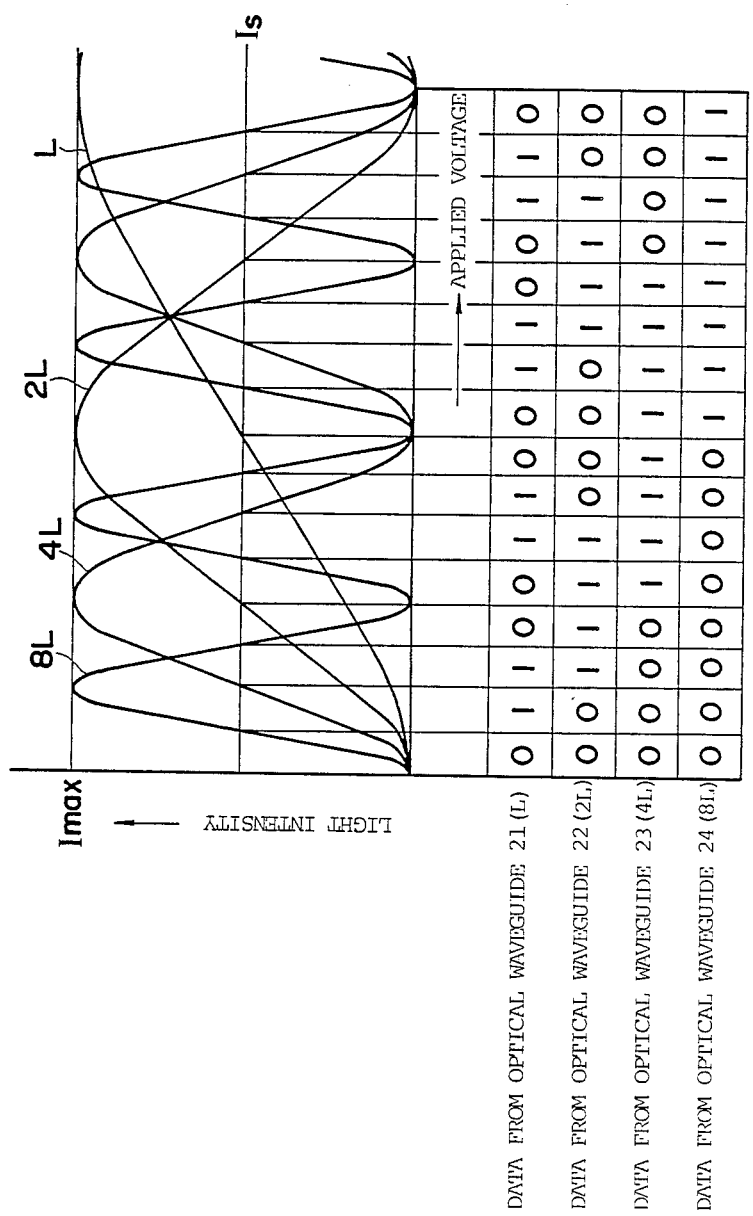

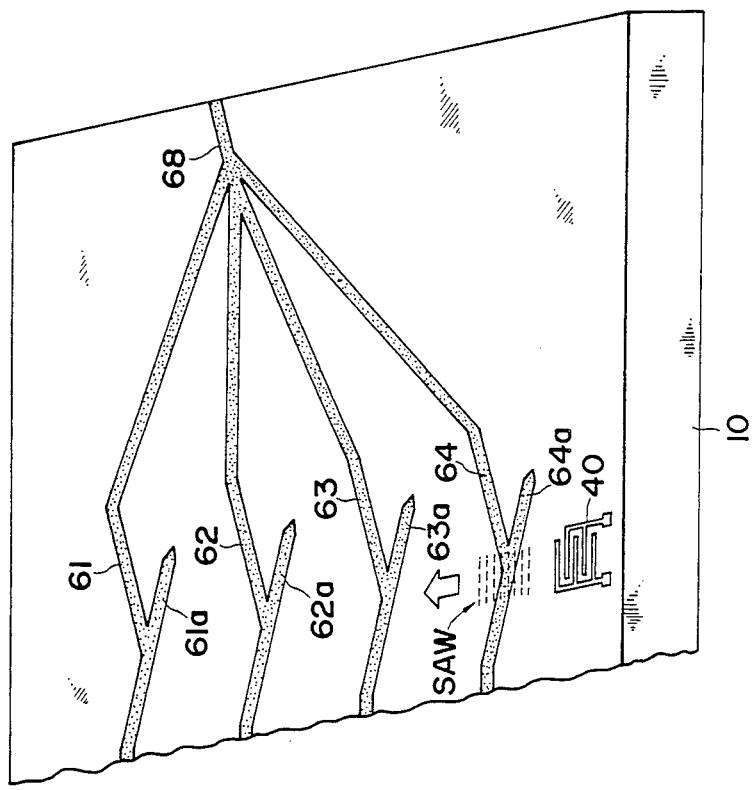

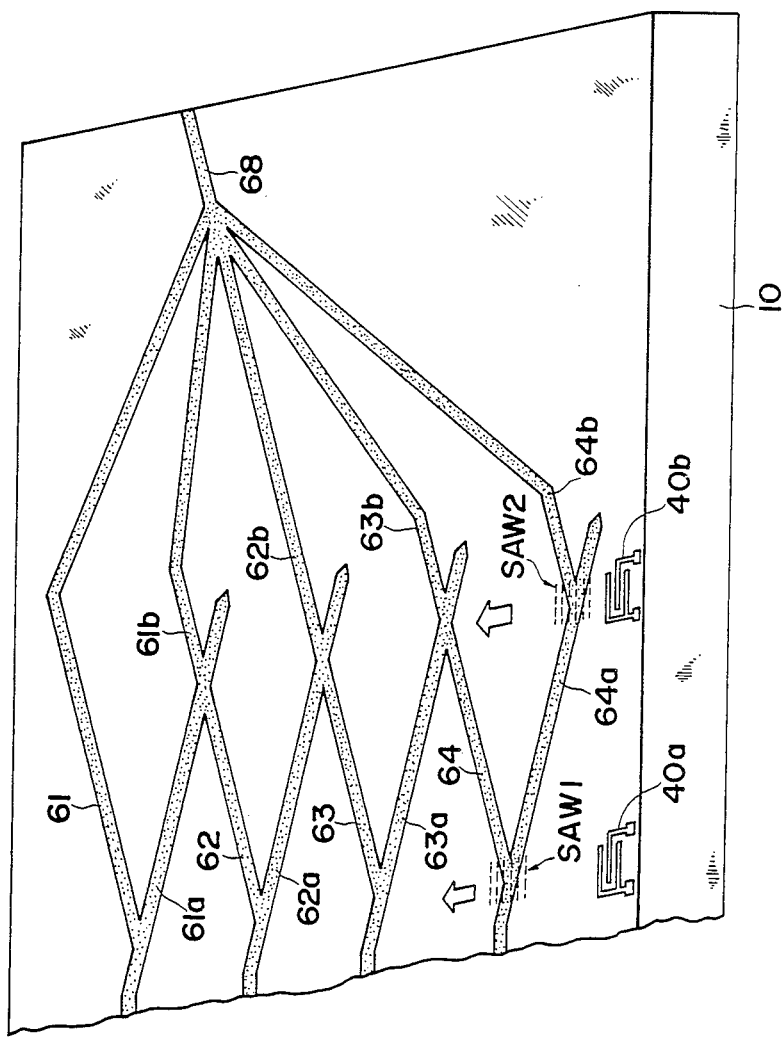

WAVEGUIDE-TYPE OPTICAL SENSOR

BACKGROUND OF THE INVENTION

This invention relates to a waveguide-type optical sensor for optically sensing voltage, temperature, pressure, humidity and other phystical quantities.

Optical transmissions are highly advantageous in that they are not influenced by electromagnetic noise. For this reason, light is suitable as the medium for transmitting data in an environment where much electromagnetic noise is encountered. The use of optical fibers enables optical data transmission with little loss and therefore allows data to be transmitted over comparatively long distances. If the data for optical transmission are measurement data, such as measured values indicative of certain physical quantities, it is preferred that measurement or detection be performed in the form of light, i.e., in an optic mode, and that the resulting measurement data be transmitted optically as such through an optical fiber. A very practical device for accomplishing this is referred to as an optical sensor or optical fiber sensor.

In order to measure such physical quantities as voltage, pressure, temperature and humidity with a high degree precision and over a wide dynamic range, it is required that use be made of a plurality of sensing elements having sensitivities and sensing regions that differ from one another. If optical fibers of a number equal to that of these plural sensing elements are provided in order to optically transmit the measurement data obtained from the respective elements, a large quantity of these optical fibers will be necessary. If the data are to be optically transmitted over long distances, procuring the optical fibers will entail considerable expense.

Likewise, if voltage, pressure, temperature, humidity and other physical quantities are to be measured simultaneously, a plurality of sensing elements of a type which will depend upon the kinds of physical quantities measured will be required. As mentioned above, providing optical fibers for respective ones of these plural elements to optically transmit the measurement data obtained from them demands a large number of optical fibers and, hence, results in considerable expenditure for long-distance optical transmission.

Thus, a problem encountered in the prior art is high cost which results from the need to provide an optical fiber for each sensing element in order to optically transmit data from the element.

SUMMARY OF THE INVENTION

Accordingly, an object of the present invention is to provide a waveguide-type optical sensor of the type which exhibits high precision and wide dynamic range achieved by inclusion of a plurality of sensing elements, and of the type which is capable of measuring various physical quantities simultaneously by inclusion of a plurality of sensing elements, wherein the sensor is so adapted as to enable plural items of detection or measurement data to be transmitted by a single optical fiber or electric cable.

According to the present invention, the foregoing object is attained by providing a waveguide-type optical sensor, comprising a substrate exhibiting an optical characteristic that varies in dependence upon a physical quantity to be sensed, diverging means for causing a light beam introduced onto the substrate to diverge into a plurality of light beams, a plurality of modulating elements formed on the substrate for modulating the intensity of the diverged light beams in dependence upon an applied physical quantity, and optical parallel/serial conversion means formed on the substrate for converting, in a time sequence, a plurality of light beams outputted by respective ones of the modulating elements into a serial optical signal.

If it is desired to attain high precision and a wide dynamic range, the plurality of modulating elements are arranged in such a manner that the intensities of the respective light beams propagating therethrough are modulated in response to the same physical quantity to an extent that differs from one light beam to another. With such an arrangement, the intensity-modulated patterns obtained from the modulating elements differ from one another and vary in dependence upon the applied physical quantity. Therefore, by analyzing these patterns, detailed data relating to the applied physical quantity can be obtained. This makes it possible to measure or detect physical quantities with high precision and over a wide dynamic range.

When a plurality of different physical quantities are to be measured simultaneously, all that need be done is to arrange the plurality of modulating elements so as to modulate the intensities of the respective light beams propagating therethrough in dependence upon the kind of physical quantity applied.

Accordingly to the present invention, the diverging means are provided for causing a light beam introduced onto the substrate to diverge into a plurality of light beams. Accordingly, it is possible to introduce the light beam to the substrate by a single optical fiber. It is of course permissible to optically couple light from a light source such as a semiconductor laser to the substrate directly.

The optical parallel/serial conversion means is provided for converting, in a time sequence, a plurality of light beams outputted by respective ones of the plural modulating elements into a serial optical signal. This makes it possible to transmit the optical signal by way of a single optical fiber. Since the optical signal includes measurement and detection data indicative of the applied physical quantity, these data can be transmitted optically through a single optical fiber. One optoelectronic converter will suffice even if this optical signal is to be converted into an electric signal. This results in a simpler arrangement on the processor side.

These and other characterizing features of the present invention will become clear from a description of preferred embodiments with reference to the accompanying drawings.

BRIEF DESCRIPTION OF THE DRAWINGS

FIG. 4 is a view showing the relation between applied voltage and the output light intensity from each of four optical waveguides of Mach-Zehnder type, as well as a four-bit signal obtained by the binary encoding of these output light intensities;

FIGS. 11 and 12 are perspective views illustrating other examples of optical parallel/serial converting means according to the present invention.

DETAILED DESCRIPTION OF THE PREFERRED EMBODIMENTS

The first embodiment of the present invention relates to a waveguide-type optical sensor for sensing voltage.

Figure 1:
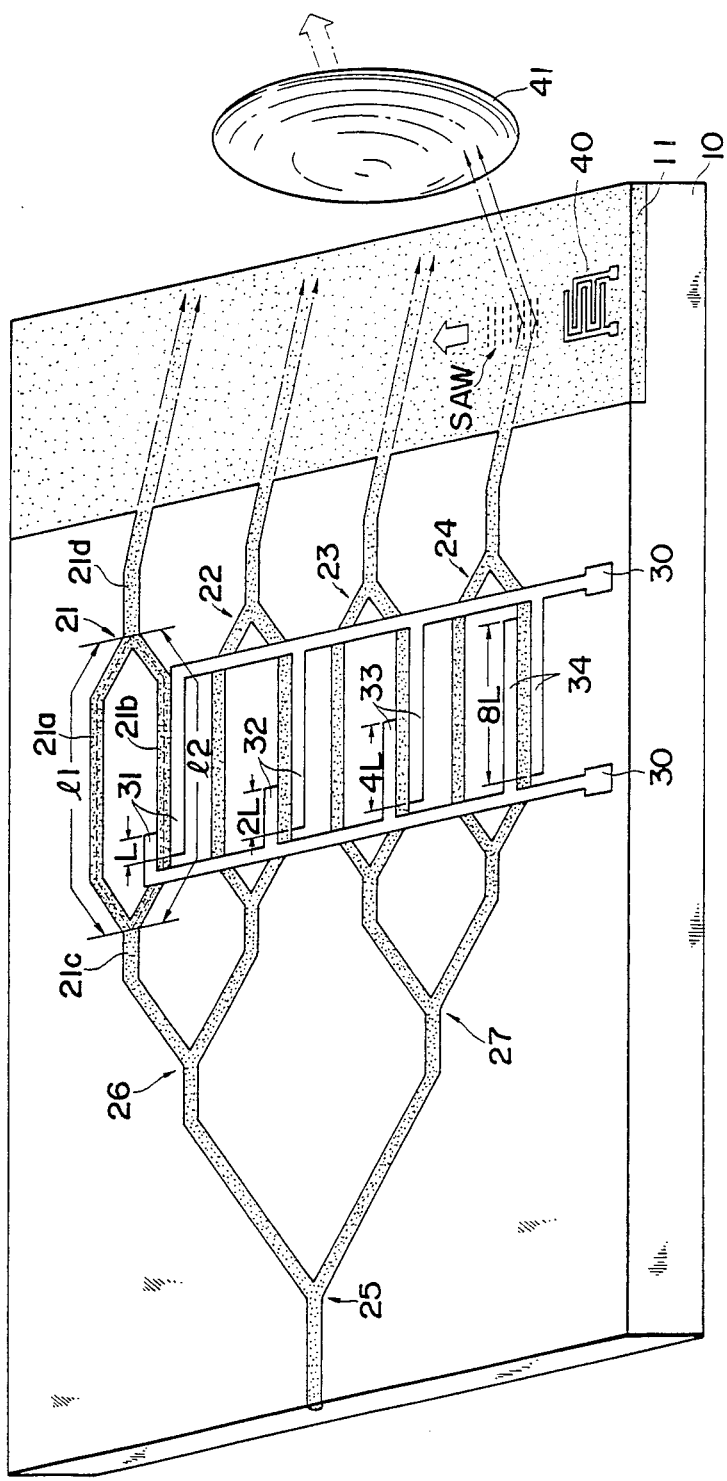
FIG. 1 is a perspective view illustrating a first embodiment of a waveguide-type optical sensor according to the present invention.

As shown in FIG. 1, the waveguide-type optical sensor includes a substrate 10 comprising a Y-cut slab of $LiNbO_3$ exhibiting an electro-optic effect. Formed on the substrate 10 are Y-shaped optical waveguides 25–27 for equally splitting input light into four light beams, four optical waveguides 21–24 of Mach-Zehnder type serving as intensity modulation elements, and an optical waveguide layer 11 for performing an optical parallel/serial (hereafter referred to as "P/S") conversion.

The Mach-Zehnder optical waveguide 21 comprises an optical waveguide portion 21c for input light, two optical waveguide branches 21a, 21b which diverge from the optical waveguide 21c at equal angles, and an output optical waveguide 21d into which the optical waveguides 21a, 21b reconverge. The other Mach-Zehnder optical waveguides 22–24 are of exactly the same construction.

A pair of electrodes 31 are formed on the substrate 10, one on each side of one optical waveguide branch 21b of the Mach-Zehnder optical waveguide 21. The electrodes 31 are electrically connected to a pair of terminals 30 to which a voltage to be measured is applied. Likewise, electrode pairs 32–34 are provided on both sides of one of the optical waveguide branches of the other Mach-Zehnder optical waveguides 22–24, respectively, and these electrode pairs are connected to the terminals 30. The length of that portion of the electrode pair 31 along which the two electrodes oppose each other from both sides of the optical waveguide branch 21b is represented by L, where $2^0 L = L$. The length L is that length of the optical waveguide branch 21b to which the abovementioned voltage is applied. Likewise, the lengths of those portions of the other electrode pairs 32, 33, 34 along which the two electrodes oppose each other are set to $2^1 L = 2L$, $2^2 L = 4L$, and $2^3 L = 8L$, respectively.

Input light introduced into the Y-shaped optical waveguide 25 is split equally into two light beams thereby. The two resulting light beams are each again split into light beams of equal intensity by respective ones of the Y-shaped optical waveguide branches 26, 27. The four resulting light beams are guided into the input optical waveguide portions of respectives ones of the four Mach-Zehnder optical waveguides 21–24. Thus, light beams of equal intensity are applied to each of the Mach-Zehnder optical waveguides 21–24. The introduction of the input light to the Y-shaped optical waveguide 25 can be achieved by optically coupling a light source such as a semiconductor laser directly to the end face of the optical waveguide 25 or by guiding the light from a light source through an optical fiber and optically coupling this fiber to the optical waveguide 25 via a suitable optical coupler.

The output optical waveguide portions (only one of which is indicated by a reference numeral, i.e., numeral 21d) of the Mach-Zehnder optical waveguides 21–24 are connected to the optical waveguide layer 11. An interdigital transducer (hereafter referred to as an "IDT") 40 is formed on one side of the optical waveguide layer 11. As will be set forth below, a pulsating high-frequency voltage is applied to the IDT 40, in response to which the IDT 40 generates a pulsed surface acoustic wave (hereafter abbreviated to SAW) which propagates through the optical waveguide layer 11. The propagation direction of the output light beams [namely the direction in which the output optical waveguide portions (21d, etc.) extend] and the SAW propagation direction (namely the arrangement of the IDT 40) are determined in such a manner that the output light beams from the Mach-Zehnder optical waveguides 21–24 and the SAW will satisfy the conditions for Bragg diffraction.

The light Bragg-diffracted owing to the interaction with the SAW is focused by focusing means 41 such as a lens and is then optically coupled to a single optical fiber, not shown. Light which is not diffracted is not focused by the focusing means 41. An example of the focusing means 41 is a waveguide lens formed on the optical waveguide 11. Examples of waveguide lenses that can be used are a grating lens, Fresnel lens, geodesic lens and Luneburg lens. The focused light can also be introduced into an optical fiber directly or through a suitable optical coupler.

The Mach-Zehnder optical waveguides 21–24, the Y-shaped optical waveguides 25–27 and the optical waveguide layer 11 can be fabricated for example by forming titanium to a thickness of 200 Angstroms in a predetermined pattern on the substrate 10 through a sputtering and lift-off technique, followed by performing a diffusion treatment at a temperature of 970° C. for five hours in an atmosphere of wet oxygen gas. The channel width of the optical waveguides 21–27 is 5 microns so that single mode light can be propagated in directions parallel and perpendicular to the substrate 10. The IDT 40 and electrodes 31–34 have a two-layer structure consisting of one layer of titanium and one layer of aluminum and ordinarily are fabricated by a lift-off technique. If the width of each electrode of the IDT 40 is 2.5 microns and the inter-electrode spacing thereof also is 2.5 microns, then the Bragg angle will be 0.82° when the wavelength of the light used is 0.29 micron.

Let us now describe the modulation of light in the Mach-Zehnder optical waveguides. Since the four Mach-Zehnder optical waveguides 21–24 have effective electrode-pair lengths that differ from one another but are otherwise identical in construction, the following discussion will center on the Mach-Zehnder optical waveguide 21, which is typical of these waveguides.

The light which propagates through the input optical waveguide portion 21c of the Mach-Zehnder optical waveguide 21 diverges equally through the two optical waveguide branches 21a, 21b and reconverges in the output optical waveguide portion 21d. Since the two light beams that propagate along the optical waveguide branches 21a, 21b have diverged from a single common light beam, they will be in phase when they reconverge in the output optical waveguide portion 21d if the lengths 11,12 of the two optical waveguide branches 21a, 21b are equal. These lengths 11, 12 extend from the point of divergence to the point of convergence and are indicated by the dashed lines in FIG. 1. If propagation loss is neglected, therefore, the intensity of the light obtained at the output optical waveguide portion 21d will be equal to that at the input optical waveguide portion 21c. Generally speaking, light having an intensity (referred to as maximum intensity $I_{max}$) equal to that of the light fed into the Mach-Zehnder optical waveguide 21 will be obtained from the output optical waveguide portion 21d if the two light beams which have propagated through the optical waveguide branches 21a, 21b have a phase difference of 2 m (where m is 0 or an integer) when they reconverge at the output optical waveguide portion 21d. Letting $\Delta l = l1 - l2$ represent a difference in length between the optical waveguide branches 21a, 21b, and bearing in mind that the phase difference between the two light beams is 2 m , $\Delta l$ may be expressed as follows:

$$\Delta l = m \cdot (\lambda_0/n) \quad (1)$$

where n is the refractive index of the optical waveguide and $\lambda_0$ is the wavelength of light in vacuum.

If the difference $\Delta l$ between the lengths of the optical waveguide branches 21a, 21b is related to m and $\lambda_0$ as indicated by the following Eq. (2), then the light beams that have propagated through the optical waveguide branches 21a, 21b will have a phase difference $(2 m+1)\pi$ when they reconverge at the output optical waveguide portion 21d:

$$\Delta l = [(2 m+1)/2] \cdot (\lambda_0/n) \quad (2)$$

In such case, two light beams of opposite phase are superimposed at the output optical waveguide 21d, so that the intensity of the light obtained at this waveguide 21d is zero.

Since LiNbO$_3$ is a crystal exhibiting an electro-optic effect, the application of an electric field produces a change in its index of refraction. If an electric field E (E=V/d, where V is the applied voltage and d is the spacing between the pair of electrodes) is applied to the substrate 10 in the Z direction, the index of refraction of the substrate will change by $\Delta n = -(n^3/2) \cdot \gamma_{33} \cdot E$, where $\gamma_{33}$ is an electro-optic constant. The phase of the light that propagates through this portion of altered refractive index changes by $\Delta\phi = (2\pi/\lambda_0) \cdot l \cdot (-n^3/2) \cdot \gamma_{33} \cdot E$, where l is the length of the portion to which the electric field is applied. In the Mach-Zehnder optical waveguide 21, l=L. In the other Mach-Zehnder optical waveguides 22, 23, 24, we will have l=2L, 4L, 8L, respectively.

The voltage necessary to vary by $\pi$ the phase difference between the two light beams that propagate through the optical waveguide branches 21a, 21b (as well as the other optical waveguide branches not designated by reference numerals) is referred to as a half-wave voltage $V\pi$. Since the four Mach-Zehnder optical waveguides 21–24 have different lengths l, the half-wave voltage $V\pi$ for these optical waveguides will also differ. If the half-wave voltage of the Mach-Zehnder optical waveguide 21 is represented by $V\pi$, then the half-wave voltages of the Mach-Zehnder optical waveguides 22, 23, 24 will be $V\pi/2$, $V\pi/4$, $V\pi/8$, respectively. Thus, a characterizing feature of the present invention is that the four Mach-Zehnder optical waveguides 21–24 are modulating elements each of which has a sensitivity and dynamic range different from the others.

Figure 2:
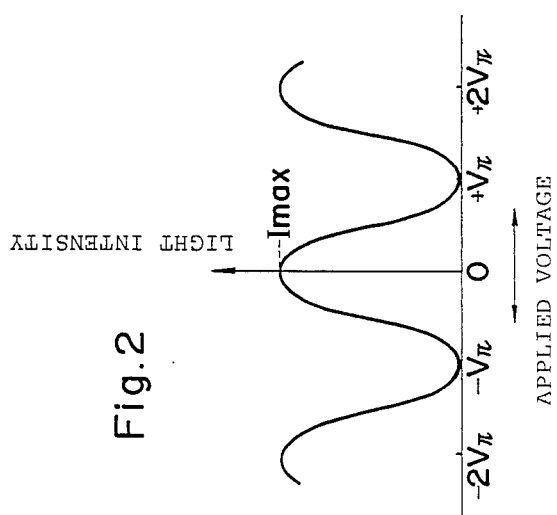

FIG. 2 illustrates the relation between voltage applied across the pair of electrodes 31 and the intensity of light obtained in the output optical waveguide 21d for a case where the difference $\Delta l$ between the lengths of the optical waveguide branches 21a, 21b satisfies Eq. (1). Since the phase of the light beam varies at the one optical waveguide branch 21b in dependence upon the applied voltage, as mentioned above, the intensity of the output light varies in accordance with $I = I_{max} \cdot \cos^2(\Delta\phi/2)$. When the applied voltage is $\pm 2$ mV$\pi$, light having the maximum intensity $I_{max}$ is obtained at the output. When a voltage of $\pm(2 m+1)V\pi$ is applied, the light output has an intensity of zero.

Figure 3:
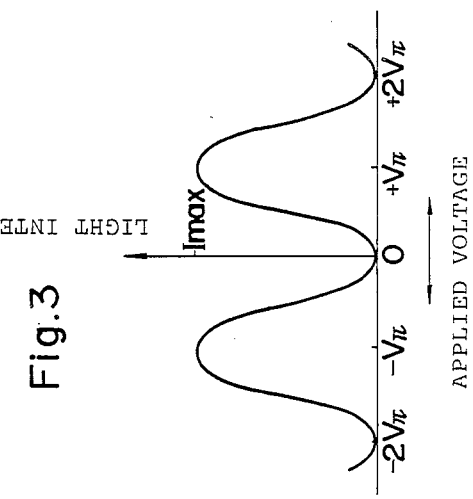
FIGS. 2 and 3 are graphs illustrating the relation between applied voltage and output light intensity.

FIG. 3 illustrates the relation between voltage applied across the pair of electrodes 31 and the intensity of light obtained in the output optical waveguide 21d for a case where the difference $\Delta l$ between the lengths of the optical waveguide branches 21a, 21b satisfies Eq. (2). When the applied voltage is $\pm(2 m+1)V\pi$, light having the maximum intensity $I_{max}$ is obtained. When the applied voltage is $\pm 2$ mV$\pi$, the light output has an intensity of zero.

FIG. 4 shows the output light intensity (vertical axis) from each of the four Mach-Zehnder optical waveguides 21–24 versus a voltage to be measured (horizontal axis) impressed across the terminals 30 under conditions where a characteristic curve of the kind shown in FIG. 3 is obtained [(that is, for a case where $\Delta l$ satisfies Eq. (2)]. For convenience sake, the light intensity curves are illustrated with electrode length serving as a parameter. Specifically, L is the output light intensity of the Mach-Zehnder optical waveguide 21, and 2L, 4L, 8L are the output light intensities of the Mach-Zehnder optical waveguides 22, 23, 24, respectively. If these output light beams are converted into electric signals by photoelectric transducers, the curves of the resulting output signals will have a shape the same as or the inverse of these light intensity curves.

When such light intensity signals or electric signals are converted into a binary code by level discrimination at a level $I_S$ equivalent to $I_{max}/2$, data in the form of a four-bit signal representing the voltage to be measured is obtained, as shown in the lower half of FIG. 4. It will be appreciated that the voltage to be measured is uniquely expressed by this four-bit data. Highly precise measurement of voltage is thus achieved.

It goes without saying that four-bit data representing a voltage to be measured will be similarly acquired even under conditions where a characteristic curve of the kind shown in FIG. 2 is obtained [(that is, for a case where $\Delta l$ satisfies Eq. (1)]. It should also be noted that any level can serve as the discrimination level, and that discrimination can be performed at a plurality of levels.

Let us return to FIG. 1. In the process of propagating through the optical waveguide layer 11, the pulsed SAW generated by the IDT 40 first interacts with the output light from the Mach-Zehnder optical waveguide 24 and causes the output light beam to diffract. At this point in time the SAW does not yet interact with the other Mach-Zehnder optical waveguides 23–21. Next, the SAW interacts with the output light from the Mach-Zehnder optical waveguide 23 and causes this output light beam to diffract. In this manner the output light beams from all four of the Mach-Zehnder optical waveguides 24–21 are diffracted successively, as a result of which optical signals are obtained serially along a time axis. This makes it feasible to transit focused refracted light, in serial form, by way of a single optical fiber.

Figure 5:
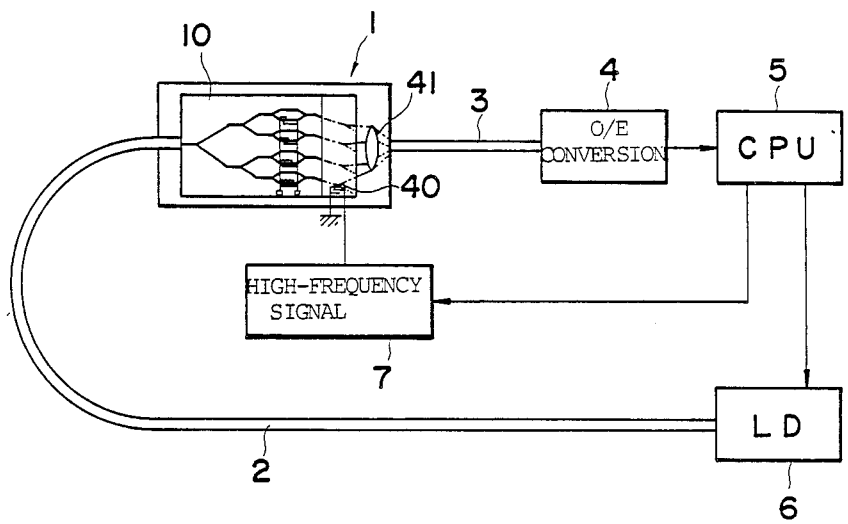
FIGS. 5 and 6 are block diagrams showing the construction of an optical measurement system.

FIG. 5 is a view depicting an optical measurement system utilizing the above-described waveguide-type optical sensor, indicated at reference numeral 1. The system includes a laser diode 6 for producing a laser beam transmitted to the waveguide-type optical sensor 1 by an optical fiber 2 whence the laser beam is fed into the Y-shaped optical waveguide 25 of the sensor. The system further includes a high-frequency signal generator 7 for producing a high-frequency output signal applied to the IDT 40. The laser beam fed into the optical sensor 1 is converted into the serial optical signal, which is then focused by the lens 41. The resulting focused optical signal is fed into an optoelectronic (O/E) converter 4 by an optical fiber 3. The O/E converter 4 converts the optical signal into an electric signal subjected to a level discrimination at a level corresponding to the aforementioned level $I_S$. Thus, the O/E converter 4 produces a four-bit output signal inputted to a CPU 5 which, on the basis of this signal, calculates the value of the voltage to be measured. The high-frequency signal generator 7 and the laser diode 6 are controlled by the CPU 5 to compensate for temperature and the like. Thus, the configuration shown in FIG. 5 provides a measurement system in which an optical signal is transmitted by the optical fibers 2, 3 without being influenced by electromagnetic noise.

Figure 6:
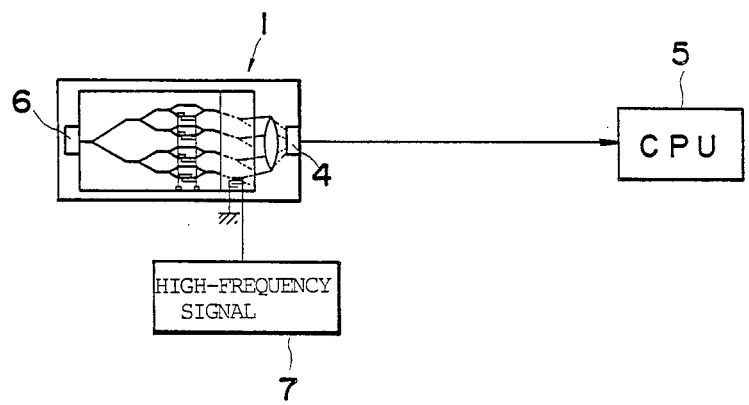

FIG. 6 illustrates another embodiment of an optical measurement system utilizing the above-described waveguide-type optical sensor 1. Here the laser beam from the laser diode 6 is optically coupled directly to the optical waveguide 25 on the substrate 10. The output optical signal resulting from the serial conversion is converted into an electric signal by the O/E converter 4 before being sent to the CPU 5 via a cable. Thus, a signal can be transmitted either in the form of light (FIG. 5) or in the form of electricity (FIG. 6).

Figure 7:
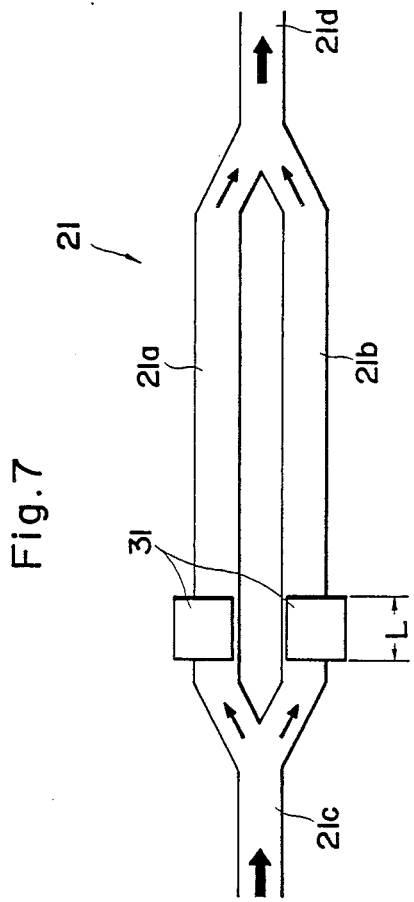
FIG. 7 is a plan view illustrating another electrode arrangement.

FIG. 7 is a plan view illustrating another example of an electrode arrangement in the Mach-Zehnder optical waveguides If the substrate 10 is a Z-cut slab of LiNbO$_3$, electrodes 31 are provided on both of the optical waveguide branches 21a, 21b of the Mach-Zehnder optical waveguide 21. When a voltage is applied across these electrodes 31, the refractive index of one of the optical waveguide branches 21a, 21b increases while that of the other decreases, thus producing a phase difference in the light beams which propagate therethrough. As a result, the intensity of the light beam output from the output optical waveguide portion 21d is modulated, just as in the case described earlier.

Figure 8:
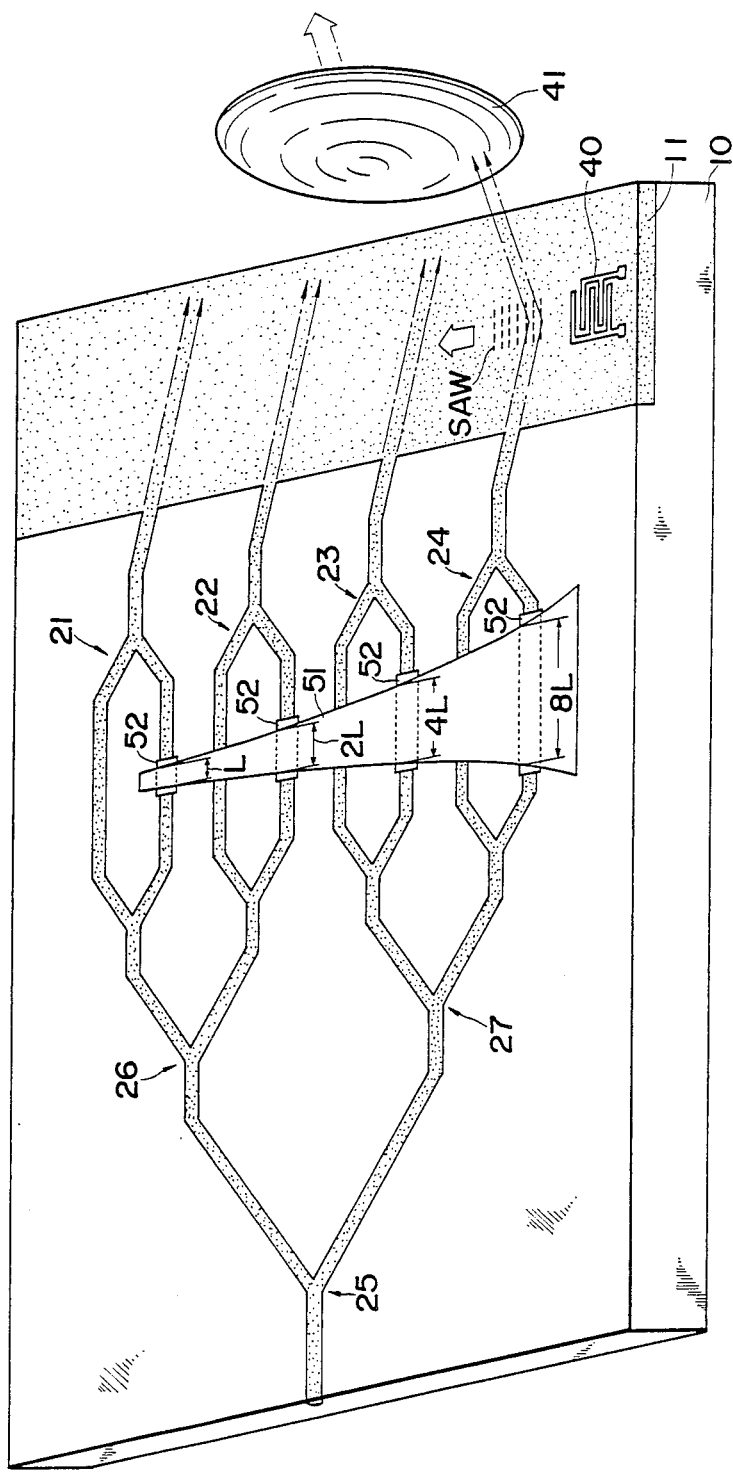
FIG. 8 is a perspective view illustrating a second embodiment of a waveguide-type optical sensor according to the present invention.

FIG. 8 illustrates a second embodiment of the waveguide-type optical sensor of the present invention, in which pressure is the physical quantity sensed. The substrate 10 in the present waveguide-type optical sensor comprises a slab of a material exhibiting photoelasticity, such as a slab of LiNbO$_3$. A substrate of this type shows a change in its refractive index when pressure is applied thereto. The sensor includes a plate 51 the width whereof gradually diminishes from one end to the other. The plate 51 is so provided as to cross the four Mach-Zehnder optical waveguides 21–24. A pad 52 is interposed between one optical waveguide branch of each of these optical waveguide 21–24 and the plate 51. Thus, it is so arranged that pressure applied to the plate 51 will act upon the one optical waveguide branch of each Mach-Zehnder optical waveguide via the corresponding pad 52 but not the other optical waveguide branch. The length l of that portion of the optical waveguide branch upon which the pressure is applied is set to L, 2L, 4L and 8L in the Mach-Zehnder optical waveguides 21, 22, 23 and 24, respectively. Owing to the application of a pressure P, a light beam propagating along a optical waveguide branch undergoes a change in phase $\Delta\phi = (2\pi/\lambda_0)\cdot C\cdot l\cdot P$, where C represents a photoelastic constant. Accordingly, output light from each Mach-Zehnder optical waveguide will undergo a change in intensity in dependence upon the applied pressure, thus enabling pressure to be measured based on the principle described above in connection with the voltage sensor.

Figure 9:
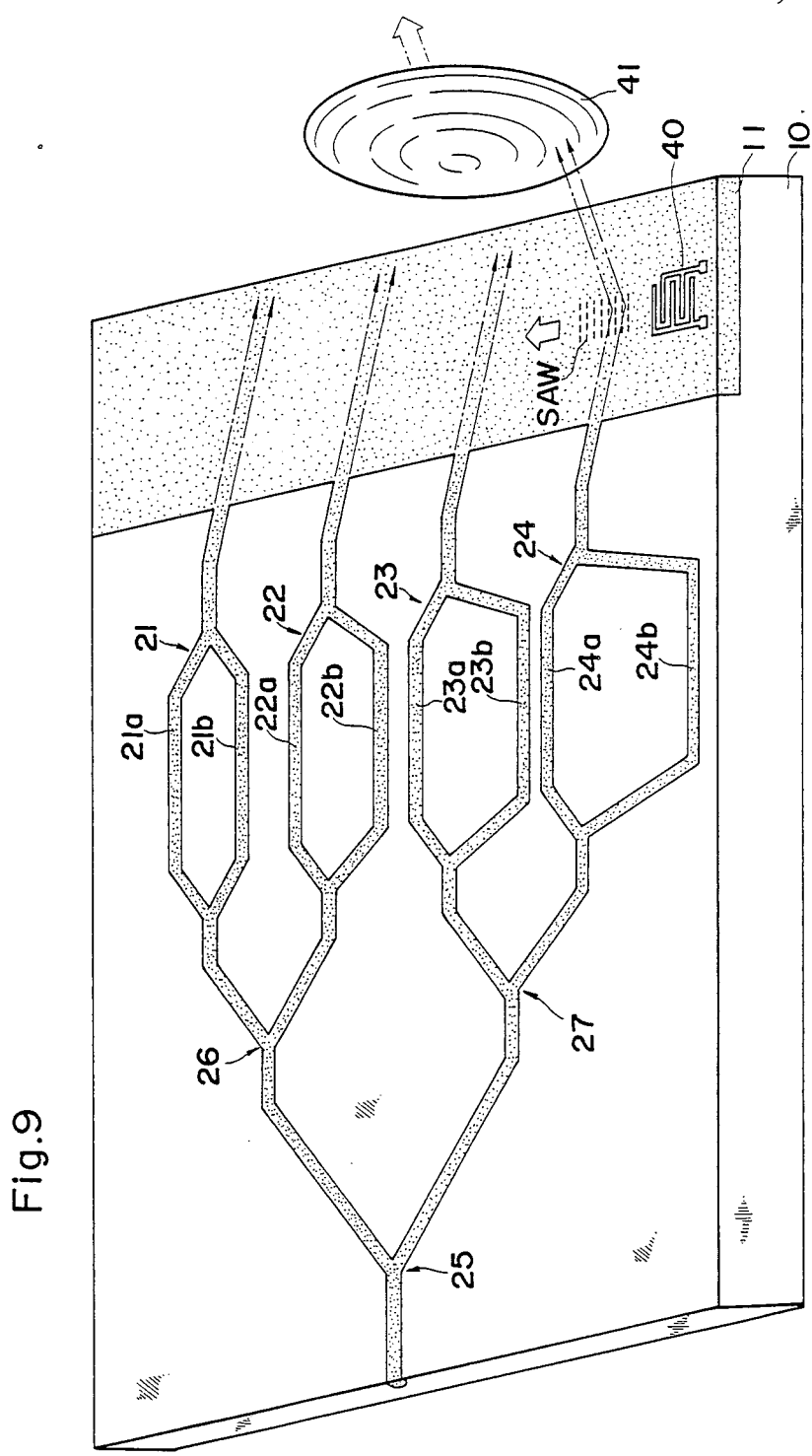
FIG. 9 is a perspective view illustrating a third embodiment of a waveguide-type optical sensor according to the present invention.

FIG. 9 illustrates a third embodiment of the waveguide-type optical sensor of the present invention, in which temperature is the physical quantity sensed.

As shown in FIG. 9, the four Mach-Zehnder optical waveguides 21–24 have two optical waveguide branches 21a, 21b–24a, 24b, respectively. The optical waveguide branches 21a–24a are all of the same length, while the optical waveguide branches 21b–24b have lengths that differ from one another. The differences in length between the optical waveguide branches 21a, 21b; 22a, 22b; 23a, 23b; and 24a, 24b fall into a ratio of L:2L:4L:8L. These differences in length naturally satisfy Eq. (1) or (2).

If the substrate 10 consists of LiNbO$_3$, its refractive index will increase by $5.3 \times 10^{-5}$ for each 1° C. rise in temperature. Accordingly, for a temperature change of $\Delta T$, the phase difference $\Delta\phi$ between light beams propagating through the two optical waveguide branches of each Mach-Zehnder optical waveguide changes by $(2\pi/\lambda_0)\cdot l\cdot 66 T \times 5.3 \times 10^{-5}$ where l is the difference in length between the two optical waveguide branches. Thus, the output light from a Mach-Zehnder optical waveguide is modulated in dependence upon temperature in the optical sensor of FIG. 9.

In the present invention, substrates consisting of a variety materials can be used so long as the material exhibits an optical characteristic that varies with a change in various physical quantities. In addition to LiNbO$_3$, examples of materials that can be used include TiO$_2$ and LiTaO$_3$. Physical quantities that can be sensed include humidity and gas concentration, in addition to voltage, pressure and temperature. For instance, humidity can be sensed by using a material whose refractive index changes with a variation in humidity and depositing a buffer layer on the optical waveguides. A chemical sensor can be realized by depositing a material whose refractive index changes with a variation in the concentration of a gas.

Obviously, any number of Mach-Zehnder optical waveguides can be formed on the substrate. Furthermore, the light intensity modulating elements are not limited to the above-described Mach-Zehnder optical waveguides. Other examples of devices that can be utilized as light intensity modulating elements include a directional coupler between waveguides, as well as a waveguide-type light beam splitter described in the specification of U.S. Application Ser. No. 496,213, entitled "Slab-type Optical Device".

Various methods can be employed to form the optical waveguides on the substrate.

Figure 10:
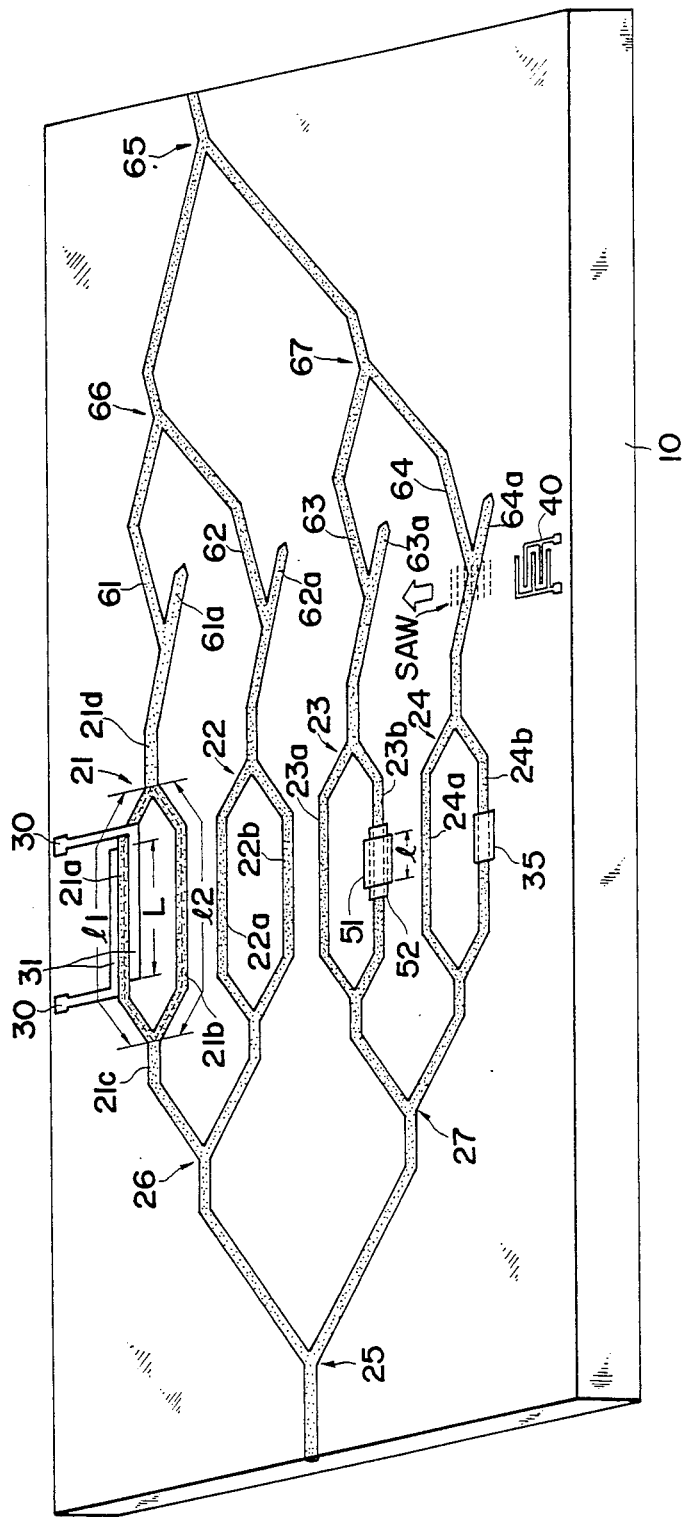
FIG. 10 is a perspective view illustrating a fourth embodiment of a waveguide-type optical sensor according to the present invention.

FIG. 10 illustrates a fourth embodiment of the present invention. The substrate 10 in the waveguide-type optical sensor of this embodiment comprises a Y-cut slab of LiNbO$_3$ which exhibits an electro-optic effect, photoelastic effect and acousto-optic effect, and which has a refractive index that varies with temperature. Formed on the substrate 10 are the above-described Y-shaped optical waveguides 25–27, the four Mach-Zehnder optical waveguides 21–24 serving as the light intensity modulating elements, optical waveguides 61, 61a–64, 64a for performing an optical P/S conversion, and Y-shaped optical waveguides 65–67 for focusing light resulting from the P/S conversion.

The Mach-Zehnder optical waveguide 21 is for measuring voltage, and the Mach-Zehnder optical waveguides 22, 23 and 24 are used to measure temperature, pressure and humidity, respectively.

The output optical waveguide portions (21d, etc.) of the Mach-Zehnder optical waveguides 21–24 have their output ends connected to the optical waveguides 61a–64a respectively. The directions of the output optical waveguides 61a–64a and the arrangement of the IDT 40 are set in such a manner that the light beams that propagate through the optical waveguides 61a–64a and the SAW generated by the IDT 40 satisfy the conditions for Bragg diffraction.

At the points where the light beams that propagate through the optical waveguides 61a–64a interact with the SAW, the optical waveguides 61–64, which are for guiding the light beams diffracted by the SAW, diverge from the optical waveguides 61a–64a, respectively. This angle of divergence is equal to twice the Bragg angle. Preferably, a design is adopted that will not cause the light to be reflected at the terminus of each of the optical waveguides 61a–64a.

The optical waveguides 61, 62 are connected to the Y-shaped optical waveguide 66, and the optical waveguides 63, 64 are connected to the Y-shaped optical waveguide 67. These Y-shaped optical waveguides 66, 67 are connected to the Y-shaped optical waveguide 65, whereby the diffracted light is focused. The output side of the Y-shaped optical waveguide 65 is optically coupled to a single optical fiber, by way of example.

The pair of electrodes 31 are provided on both sides of one optical waveguide branch 21a of the Mach-Zehnder optical waveguide 21. It will be understood from the description of the first embodiment illustrated in FIG. 1 that the output light intensity from the output optical waveguide 21d of this Mach-Zehnder optical waveguide 21 will represent a voltage applied across the electrodes 31.

In accordance with the principle of temperature measurement performed in the third embodiment of FIG. 9, the output light intensity from the Mach-Zehnder optical waveguide 22 will be modulated by temperature.

A plate 51 is provided on one optical waveguide branch 23b of the Mach-Zehnder optical waveguide 23 through the intermediary of the pad 52, and pressure is applied to the plate 51. The applied pressure is be measured by this optical waveguide 23, just as described in connection with the second embodiment shown in FIG. 8.

A buffer layer 35 comprising a polymeric material whose refractive index changes with a variation in humidity is deposited on one optical waveguide branch 24b of the Mach-Zehnder optical waveguide 24. The output light from the Mach-Zehnder optical waveguide 24 is varied in intensity by a change in the refractive index of the buffer layer 35 ascribable to a change in humidity.

Thus, the Mach-Zehnder optical waveguides 21–24 produce output light beams the respective intensities whereof are modulated by such physical quantities as voltage, temperature, pressure and humidity. Owing to the interaction with the SAW, these light beams are converted into serial signals focused by the respective Y-shaped optical waveguides 65–67.

The embodiment of FIG. 10 is particularly noteworthy in that since the light beams which interact with the SAW are confined in the optical waveguides 61a–64a, the light spreads very little so that the major portion thereof interacts with the SAW, thus assuring a highly efficient P/S conversion and the acquisition of a high-intensity optical signal representing the measurement or detection data.

FIG. 11 shows another example of focusing means. Here the output sides of the optical waveguides 61–64 converge directly into an output optical waveguide 68 in such a manner that diffracted light introduced into the optical waveguides 61–64 proceeds directly to the optical waveguide 68.

FIG. 11 shows another example of P/S conversion means and focusing means. Here two IDTs 40a, 40b are provided. The IDT 40b, which generates a SAW 2, is provided in order to diffract light which advances linearly without having been diffracted by a SAW 1 generated by the IDT 40a. Light propagating through the optical waveguide 61a is diffracted simultaneously by the SAW 1 and SAW 2. The diffracted light beams traverse the optical waveguides 61, 61b and converge in the output optical waveguide 68. The foregoing similarly holds for light propagating through the other optical waveguides 62a–64a as well. It is thus possible to achieve an even higher diffraction efficiency and an output optical signal having an even higher intensity.

It should be noted that the optical P/S conversion means including the optical waveguide layer 11 of the first embodiment shown in FIG. 1 can be replaced by the optical P/S conversion means including the optical waveguides 61–64 of the type shown in FIGS. 10 through 12. Conversely, the optical P/S conversion means of the fourth embodiment shown in FIG. 10 can be exchanged for the optical P/S conversion means of FIG. 1. Further, the substrate 10 can be provided with plural groups of modulating elements for respective ones of a plurality of different physical quantities, each group comprising a plurality of light intensity modulating elements of different dynamic ranges and sensitivities for sensing the same type of physical quantity.

As many apparently widely different embodiments of the present invention can be made without departing from the spirit and scope thereof, it is to be understood that the invention is not limited to the specific embodiments thereof except as defined in the appended claims.

What is claimed is:

1. A waveguide-type optical sensor for sensing a physical quantity capable of varying a refractive index of material, said sensor comprising:

a substrate having a refractive index that varies in dependence upon said physical quantity to be sensed;

diverging means for causing a light beam introduced onto said substrate to diverge into a plurality of light beams;

a plurality of modulating elements formed on said substrate for modulating the intensity of the diverged light beams based on the variation of said refractive index of said substrate in dependence upon an application to said substrate of said physical quantity to be sensed; and optical parallel/serial conversion means formed on said substrate for converting, in a time sequence, a plurality of light beams outputted by respective ones of said modulating elements into a serial optical signal.

2. The waveguide-type optical sensor as defined in claim 1, wherein said plurality of modulating elements have dynamic ranges and sensitivities that differ from one another for an identical applied physical quantity for modulating the intensity of the light beams based on the variation of said refractive index of said substrate in dependence upon an application to said substrate of said physical quantity to be sensed.

3. The waveguide-type optical sensor as defined in claim 1, wherein said substrate has plural refractive indexes that vary in dependence upon plural varieties of physical quantities to be sensed, said plurality of modulating elements each modulating the intensity of a light beam based on a variation of one of said refractive indexes of said substrate in dependence upon an application to said substrate of a respective one of the plural varieties of physical quantities to be sensed.

4. The waveguide-type optical sensor as defined in claim 1, wherein said optical parallel/serial conversion means comprises:

first optical waveguide portions connected to output sides of respective ones of said modulating elements;

second optical waveguide portions diverging from respective ones of said first optical waveguide portions at a predetermined angle; and means for generating a pulsed surface acoustic wave for diffracting light beams propagating through said first optical waveguide portions and introducing the resulting diffracted light beams into respective ones of said second optical waveguide portions.

5. The waveguide-type optical sensor as defined in claim 1, further comprising focusing means for focusing light beams obtained from the parallel/serial conversion performed by said parallel/serial conversion means.

6. The waveguide-type optical sensor as defined in claim 1, wherein in a case where the refractive index of said substrate is non-variable with respect to a certain physical quantity, a member having an optical characteristic that does vary with respect to said certain physical quantity is provided on said modulating elements, said modulating elements modulating the intensity of the light beams due to a change in the refractive index of said member.

* * * * *